United States Patent
VanBlon et al.

(10) Patent No.: US 9,940,929 B2
(45) Date of Patent: Apr. 10, 2018

(54) EXTENDING THE PERIOD OF VOICE RECOGNITION

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/963,995

(22) Filed: Dec. 9, 2015

(65) Prior Publication Data

US 2017/0169817 A1    Jun. 15, 2017

(51) Int. Cl.
*G10L 15/22* (2006.01)
*G10L 15/02* (2006.01)
*G10L 15/08* (2006.01)

(52) U.S. Cl.
CPC ............ *G10L 15/22* (2013.01); *G10L 15/02* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2005/0165609 A1* | 7/2005 | Zuberec | G10L 15/22 704/270 |
| 2006/0069571 A1* | 3/2006 | Falcon | G10L 15/22 704/270 |
| 2012/0101810 A1* | 4/2012 | Kennewick | G06Q 30/0261 704/9 |
| 2013/0124207 A1* | 5/2013 | Sarin | G10L 15/22 704/275 |
| 2014/0195252 A1* | 7/2014 | Gruber | G10L 15/22 704/275 |
| 2014/0337028 A1* | 11/2014 | Wang | G10L 15/005 704/251 |
| 2015/0019217 A1* | 1/2015 | Di Cristo | G06F 17/279 704/235 |
| 2015/0199965 A1* | 7/2015 | Leak | G10L 15/22 704/249 |
| 2015/0302855 A1* | 10/2015 | Kim | G10L 17/22 704/275 |
| 2015/0370531 A1* | 12/2015 | Faaborg | G06F 3/167 704/275 |
| 2016/0155443 A1* | 6/2016 | Khan | G06F 1/3203 704/275 |
| 2016/0232896 A1* | 8/2016 | LeBeau | G06F 3/167 |

* cited by examiner

*Primary Examiner* — Douglas Godbold
(74) *Attorney, Agent, or Firm* — Ference & Associates LLC

(57) ABSTRACT

One embodiment provides a method, including: receiving, at an audio capture device, an activation cue; receiving, at the audio capture device, at least one command after the activation cue; performing, using a processor, an action based on the at least one command; receiving, at the audio capture device, at least one other command; and performing, using the processor, another action based on the another command without requiring another activation cue. Other aspects are described and claimed.

16 Claims, 3 Drawing Sheets

EXTENDING THE PERIOD OF VOICE RECOGNITION

BACKGROUND

Electronic devices such as laptops, tablets, smart phones, personal assistants, etc., accept user inputs, (e.g., at audio input devices). Typically, users provide inputs to these devices to control the device as well as to enter data (e.g., requesting information, accessing information, or providing information to a communication application).

One of the fastest growing methods of user input is voice command. Voice command technology enables the operation of a device through user voice instructions. The number and type of devices capable of accepting voice control has steadily increased over time. This is especially true regarding cellular phones and stand alone personal intelligent assistants. Removing the need to use buttons or switches to control a device enables a user to perform parallel tasks safely and efficiently. However, the use of these devices can still feel unnatural or awkward, specifically when a user is required to repeatedly activate the device (e.g., by using a key word or trigger phrase such as "Ok Google"). GOOGLE is a registered trademark of Google Inc. in the United States and other countries.

BRIEF SUMMARY

In summary, one aspect provides a method, comprising: receiving, at an audio capture device, an activation cue; receiving, at the audio capture device, at least one command after the activation cue; performing, using a processor, an action based on the at least one command; receiving, at the audio capture device, at least one other command; and performing, using the processor, another action based on the another command without requiring another activation cue.

Another aspect provides an information handling device, comprising: a processor; an audio capture device; a memory device that stores instructions executable by the processor to: receive, at the audio capture device, an activation cue; receive, at the audio capture device, at least one command after the activation cue; perform, using the processor, an action based on the at least one command; receive, at the audio capture device, at least one other command; and perform, using the processor, another action based on the another command without requiring another activation cue.

A further aspect provides product, comprising: a storage device having code stored therewith, the code being executable by a processor and comprising: code that receives, at an audio capture device, an activation cue; code that receives, at an audio capture device, at least one command after the activation cue; code that performs, using a processor, an action based on the at least one command; code that receives, at the audio capture device, at least one other command; and code that performs, using the processor, another action based on the another command without requiring another activation cue.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
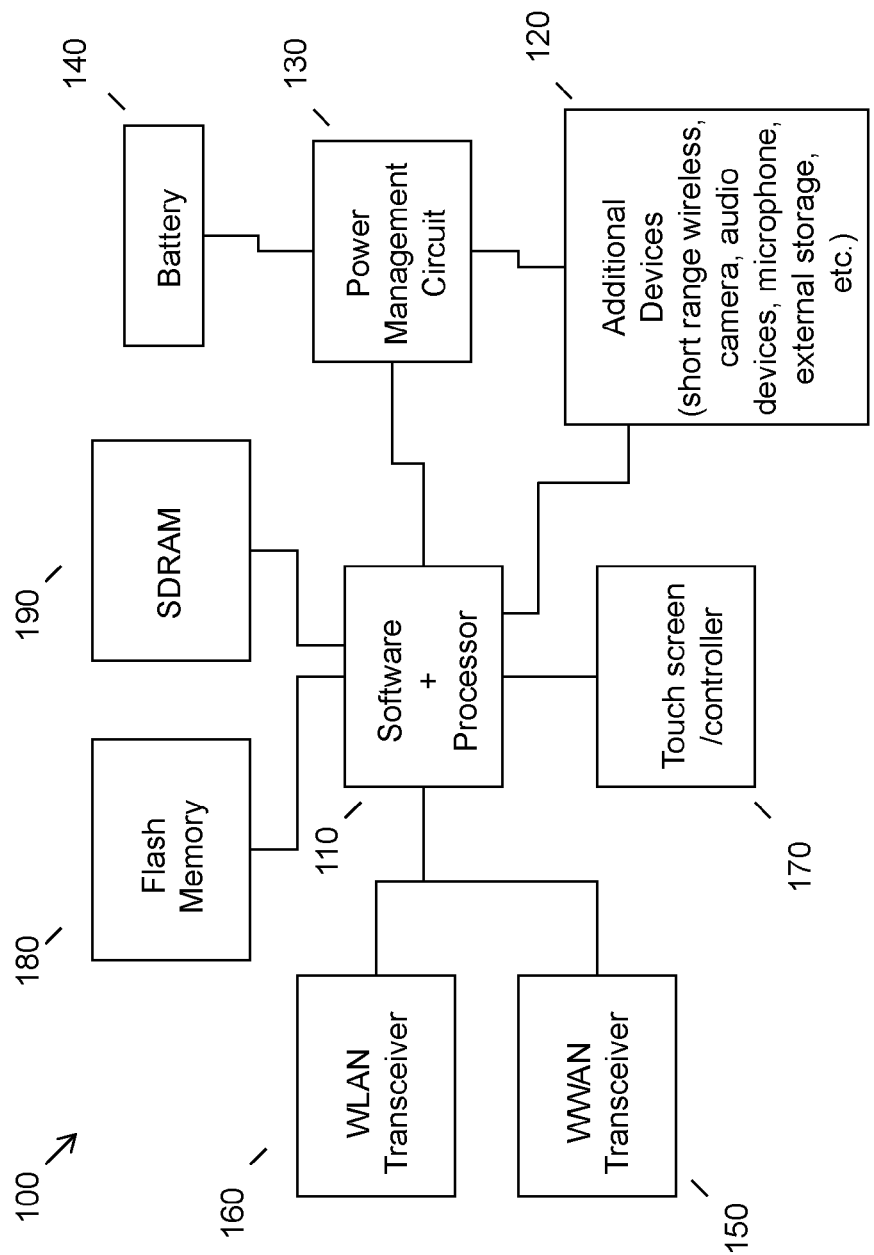
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In order to receive audio data as input (e.g., voice commands), audio capture devices must be enabled and actively listening for the audio input. However, due to various factors (e.g., battery life, privacy concerns, etc.) most audio capture devices are not constantly processing audio. Thus, a user must activate the voice command mode through some means of user input. One method is to press a button on the device (e.g., software or hardware button) which prompts the user to then enter the voice command. Alternatively, a trigger word or phrase may be used to activate a personal assistant application, for example, "Ok Google," "Hey Siri," "Hey Cortana," "Alexa," etc.). SIRI is a registered trademark of Apple Inc. in the United States of America and other countries. CORTANA is a registered trademark of Microsoft Corporation in the United States of America and other countries.

Typically, a wake up word or trigger phrase is required for each individual command. Some voice commands result in a confirmation or clarification question from the digital assistant, but this only applies to commands that are incomplete or need more information. This creates a technical issue for a user in that they are required to constantly repeat the wake up word or phrase, even if issuing multiple commands in series or in short order. This constant repetition of a single phase creates an awkward and unpleasant interaction between user and device. Thus, a solution is needed that is much more convenient in most scenarios, and does not inhibit the natural flow of human conversation.

Thus, an embodiment extends an initial wakeup word session to listen for potential follow up audio data (e.g., voice commands). These follow up commands may be filtered to commands that are similar in nature to the initial command. For example, the commands could be similar in that they involve the same application, similar hardware, etc. In one embodiment, the secondary command(s) may be accepted based on a predetermined time period (e.g., 30 seconds, 1 minute, etc.), and/or until a total predetermined number of commands are given/received during a static time period after the last command was accepted or the action associated with the command was carried out. Additionally, an embodiment may accept additional commands as long as the previous task or command is active. For example, if an embodiment is reading the current news to a user, the user can request further details (e.g., by saying "tell me more about that story") on a specific news article being read.

One embodiment may receive audio input (e.g., user voice input), and parse the input to identify an activation cue or trigger phrase (e.g., Ok Google) and a command. An embodiment may then take an action based on the received command (e.g., giving the weather forecast based on a request). An embodiment may then receive additional audio input (e.g., another user voice command) that does not contain an activation cue. The additional audio input is analyzed to determine if a relationship exists between the additional audio input and the previously entered audio input. Examples of possible relationships are discussed in detail herein. Once a relationship is determined, an embodiment may then perform the action requested in the additional input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio input device such as a microphone that processes analog audio into a digital input signal. System 100 often includes a touch screen 170 for data input and display/rendering.

System 100 also typically includes various memory devices, for example flash memory 180 and SDRAM 190.

Figure 2:
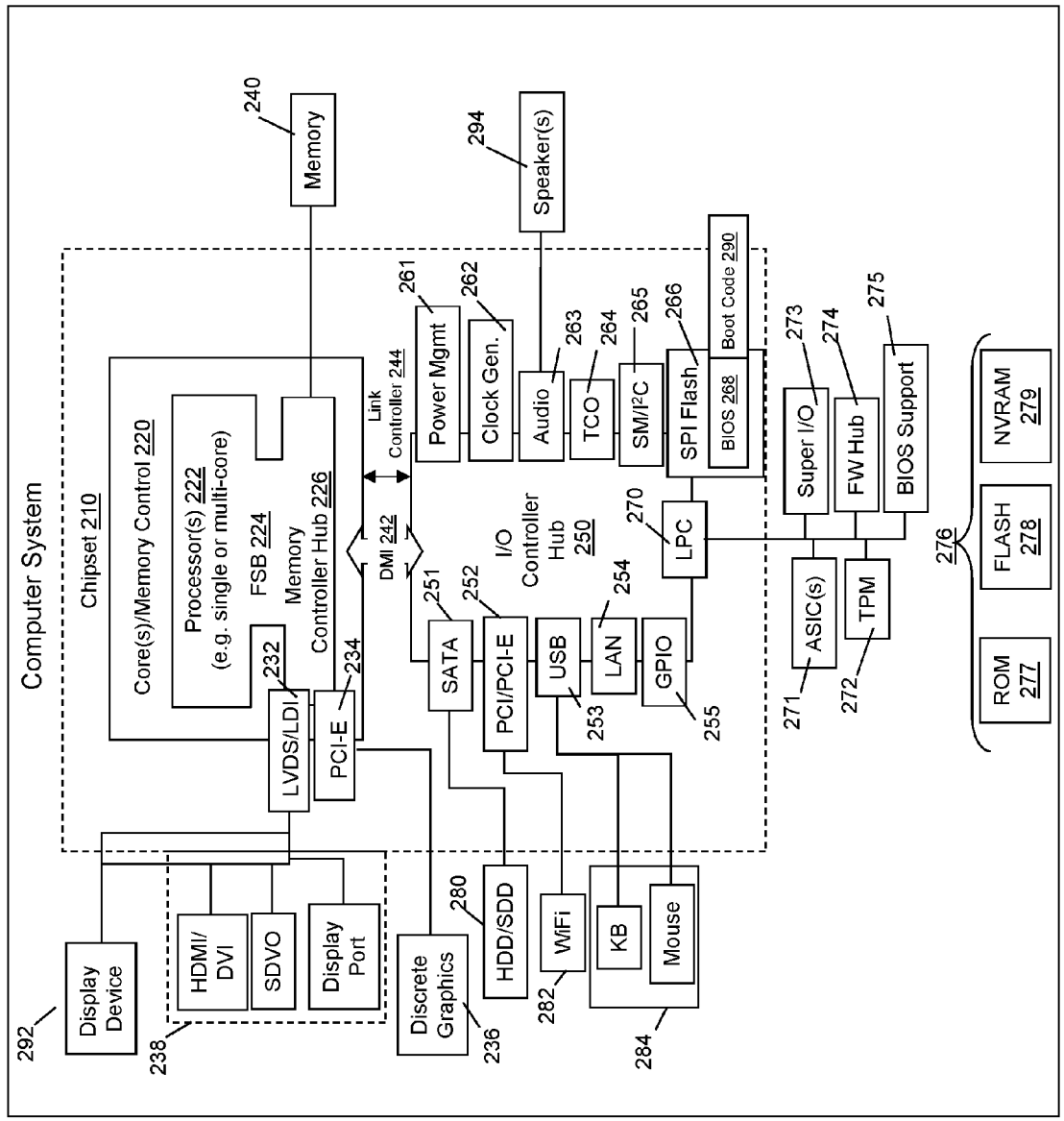
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices, and/or electronic devices generally to which users may issue voice commands in order to perform specific actions. For example, the circuitry outlined in FIG. 1 may be implemented in a tablet or smart phone embodiment, whereas the circuitry outlined in FIG. 2 may be implemented in a personal computer embodiment.

Figure 3:
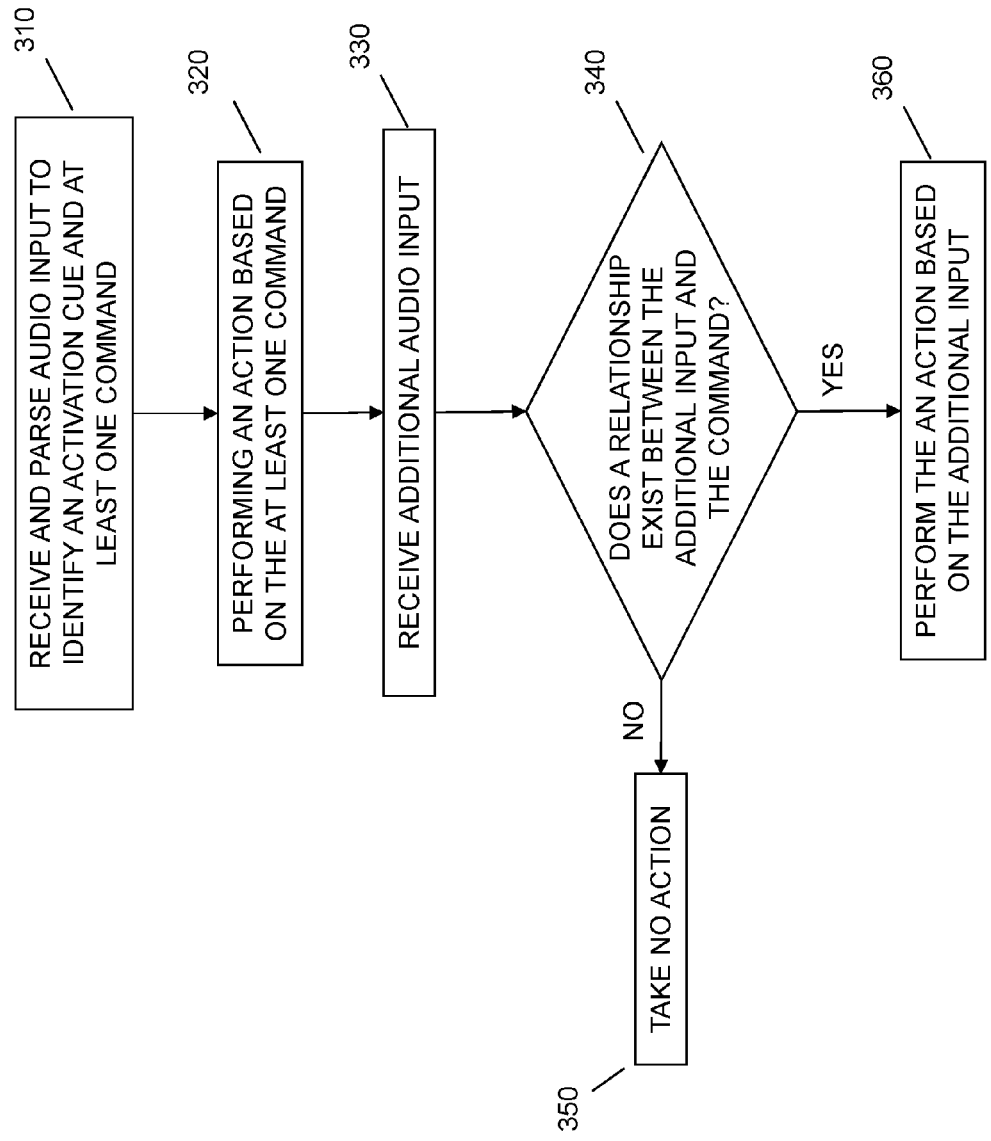
FIG. 3 illustrates an example method of extending the period of voice recognition.

Referring now to FIG. 3, an embodiment may receive audio input at 310. The audio input may be of various types, for example, human voice in the form of command inputs. Additionally, the audio input could be produced from a media device (e.g., radio, television, computer, etc.). As the audio is received, an embodiment may parse the audio to determine if it contains an activation cue or trigger phrase at 310. An activation cue or trigger phrase allows a device to "wake up" (e.g., enable a device to capture and analyze audio for performing an associated command). Currently, this wake up period is brief and only intended to allow for a single command to be entered. Thus, if a user wishes to enter multiple commands, they are required to repeat a specific phrase or word in order for the device to wake up and enter an active speech processing mode to take each subsequent action based on a given command.

An embodiment may identify one or more commands within the audio data captured at 310. Thus, an embodiment may receive audio input which contains an activation cue as well as a command (e.g., what is the weather tomorrow?"). Once an embodiment determines that the captured audio includes an activation cue, it can perform an action at 320 based on the associated command received. For example, a user may ask an embodiment to read/display an email, read/display the current news, read/display a user's calendar appointments, etc. Various example actions are disclosed herein, however it should understood that any conceivable command that may be carried out by an electronic device may be received as part of the audio input and processed as a command at 320.

Once an action has been carried out at 320, an embodiment may receive additional audio input at 330. The additional audio may, similar to the first received audio input, contain at least one command. An embodiment then determines if a relationship exists between the additional audio input and the previous determined command at 340. This relationship can take a variety of forms, such as those discussed herein.

For example, an embodiment may determine a relationship exists at 340 based on a predetermined amount of time passing between the initial audio input and the secondary audio input. Additionally or alternatively, the predetermined amount of time may be between when the action is carried out at 320 and when the second audio input (i.e., the second command) is received at 330. For example, an embodiment may receive a first audio input which comprises an activation cue and a first command. If a second audio input comprising a second command is received within a predetermined time period (e.g., 10 seconds, 30 seconds, 1 minute, etc.), an embodiment may then carry out an action based on the second received command at 360, even if no wake up cue has been provided for the second command.

However, if the additional input at 330 is received outside the predetermined time period, an embodiment may take not action at 350.

An embodiment may determine a relationship exists between the command and the additional input at 340 by identifying a correlation or association between the initial or preceding action and another action (i.e., the secondary action based on the secondary command in the additional audio input). For example, if a user requests an embodiment to turn on their lights, they may subsequently request the lights to be dimmed or brightened. The command of dimming the lights would be recognized, by an embodiment, as closely correlated or associated (in this case topically or contextually) with the previous command. Thus, the subsequent command would not require an additional activation cue. Recognizing this correlation or association greatly increases the usability of voice commands.

In an embodiment, a correlation or association may be made between a command that is received during the processing of a previous action. For example, a user may request general weather information (e.g., saying, "Cortana, what's the weather"), and then, while the requested information is being delivered to the user, an embodiment may receive and parse further audio input provided by a user. Thus, if for example, the user says "stop" while delivering the information, an embodiment may cease providing the weather information. Optionally, an embodiment may end the wake up period until an additional activation cue is thereafter received. Alternatively, an embodiment may stop delivering the weather information and allow the user to enter additional voice data without requiring the activation cue (e.g., wake up word or phrase).

Additionally, the determined relationship at 340 may be based on a universal phrase or a task specific phrase. For example, a universal phrase may be a term such as "stop" that can be used with other commands. Thus, if a user's original command involved an action that may take place over a period of time (e.g., reporting the news, reading the weather, reading an email, etc.), the term "stop" is a universally correlated or associated term with that ongoing action. Alternatively, in the case of a task specific phrase, for example requesting the dimming of lights directly after turning the lights on, a specific correlation or association exists between the first and second command. Thus, am embodiment would only take an action with regard to a "dimming" command if the previous command had a strong topical correlation, such as the act of turning on the lights (e.g., based on key words and analysis using a topical hierarchy.)

In an embodiment, the relationship identified at 340 may be based on geographic location. Thus, an embodiment may know the user or device is within a geographic location (e.g., a user's home) and may extend the wake up period based on anticipated commands. For example, if an embodiment detects that it is within the user's home, and the user issues a command to turn on the lights followed by a command to adjust the temperature, an embodiment may determine a strong correlation exists between the two requests based on geographic location because it is typical for a home owner to take certain actions upon arriving home. Alternatively, if there was no geographic link between the two commands, they would not be determined to have a relationship or correlation regarding each other.

In an embodiment, the relationship determined at 340 may be based on the time of day. Similar to the above example, if an embodiment determines that it is 6:30 pm, an embodiment may determine, e.g., based on a default rule and/or via a user history of inputs, that it is typical for a user to arrive home at 6:30 pm each week day and issue one or more commands. Thus, a series of commands, such as to turn on the lights, to adjust the temperature, and to turn on the television, may be determined to have a strong relationship due to the time of day (e.g., the time of day a user returns home and subsequently adjusts various factors relating to home comfort). Thus, an embodiment may act on one or more of these voice inputs when detected in the absence of a specific activation trigger, e.g., wake up word or phrase.

The relationship determined at 340 may be based on one or more currently active applications. For example, if a user requests an embodiment to play a specific media file (e.g., music, video, etc.) it may anticipate a subsequent request regarding the media playing application, such as: volume up/down, pause, skip track/chapter, etc. By way of further example, an embodiment may play music based on a voice command (e.g., "Cortana, Play Tom Petty"), and then allow the user to issue an additional related command (e.g., "turn it up," "skip," "I like this," "pause," "stop," etc.) without a wakeup word (i.e., activation cue). Thus, any command that relates to music or media playback would not require a wakeup word. A further embodiment may listen for music-related commands for a predefined time period, as discussed herein.

Additionally or alternatively, the relationship may be based on one or more recently active applications. By way of example, if a user issues a command to read the news shortly after they were checking email, an embodiment may allow a user to enter a subsequent command relating to email account (e.g., compose, reply, delete, etc.) even though the previous command was regarding a request for news.

Individual voice recognition may be used. Based on the recognition of an individual, for example, an embodiment may only accept commands from the person that issued the initial command at 310. In doing this, an embodiment may extend the available time to enter commands, while also ensuring that the commands are issued by a single user. Therefore, by way of voice filtering, an embodiment may identify an individual who issued a first command and accept subsequent commands from that user, e.g., for a predetermined period of time. The relationship determined at 340 is thus based on a voice recognition algorithm performed before the secondary action is carried out at 360.

An embodiment may also determine a relationship at 340 based on external factors. For example, an embodiment may only accept a command if a user is actively looking at the device. Thus, if a user is looking at the device when it receives the first audio at 310, a relationship may be established with the second command if the user continues to look at or again looks at the device (e.g., a mobile device, computer, intelligent assistant, etc.). Alternatively, if a user looks away prior to entry of the second command (i.e., receiving the additional audio input at 330), an embodiment may take no action at 350.

In addition to universal and specific correlations discussed herein, an embodiment may identify relationships between commands based on historical user data. For example, an embodiment may store or have access to any historical commands entered by a user. Thus, if a user regularly issues a series of uncorrelated commands, an embodiment may learn over time and create a relationship between the commands based on the stored historical data. For example, if a user adjusts the volume of the television (e.g., turns it down) shortly after adjusting the light level in a room (e.g., dimming the lights), an embodiment may create a relationship between the two commands although they are generally unrelated or were not related previously, e.g., by default.

A list of previously issued commands may be maintained and used to identify requests where a user has historically made follow up commands. Thus, an embodiment may listen to commands that are typically followed up with other commands (e.g., by the general population or by a particular user). For example, a user may typically adjust the playback volume of a device shortly or immediately after requesting media to be played (e.g., music, video, etc.), for example based on the media type (e.g., hard rock, classical, etc.), a current volume setting of the device application, etc. Thus, an embodiment may anticipate the upcoming volume control command (e.g., up or down) based on the media type, etc., and extend the period of time for instruction entry. Additionally or alternatively, an embodiment may determine (e.g., learn over time based on historical user input) that default relationship is unnecessary. For example if a user never adjusts their music volume, then the device may stop listening for a follow up command after playing the music. An embodiment may also allow non-similar commands to be received within a time period. Non-similar commands could allow a user to give a chain of unrelated commands. These unrelated commands may be learned, enabled, or filtered.

Accordingly, as illustrated by the example embodiments and figures, an embodiment provides a method of receiving audio input at an audio capture device. This initial audio input typically contains an activation cue and at least one command. An embodiment then performs an action based on the received command. At some subsequent point, additional audio input is received by an embodiment, and the embodiment determines if a new activation cue is required. In order to make this determination, an embodiment attempts to identify if a relationship exists between the initial audio input and the secondary input. Examples of potential relationships are discussed at length herein. Then, based on this determination, an embodiment will either perform an action based on the secondary command or take no action if no relationship exists.

The various embodiments described herein thus represent a technical improvement to interaction with electronic devices by changing the way audio inputs are processed. This improvement also allows for the device to learn over time based on previous user actions. Thus, an embodiment stores a historical repository of previously entered user commands, and creates correlations between specific commands based on the historical data. This creation of correlations allows a user to speak more naturally, and carry out tasks in an efficient and comfortable manner.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an audio capture device, an activation cue;
receiving, at the audio capture device, at least one command associated with a topic after the activation cue;
performing, using a processor, an action based on the at least one command;
receiving, at the audio capture device, at least one other command, wherein the at least one other command is irrespective of the topic; and
performing, using the processor, another action based on the at least one other command without requiring another activation cue, wherein the performing another action based on the at least one other command comprises identifying a relationship between the at least one other command and the at least one command, wherein the relationship is based on a location and wherein the action and the at least one other action are associated with the location.

2. The method of claim 1, wherein the performing the another action requires the additional audio input be received within a predetermined amount of time after performing the action.

3. The method of claim 1, wherein the relationship is based on an association between the action and the another action.

4. The method of claim 1, wherein the relationship is based on a time of day.

5. The method of claim 1, wherein the relationship is based at least one currently active application.

6. The method of claim 1, wherein the relationship is based on at least one recently active application.

7. The method of claim 1, wherein the performing another action based on the at least one other command further comprises:
accessing, in a storage device, historical user voice data;
identifying, using historical audio data, at least one associated command based on the at least one command; and
performing the another action if the at least one other command is associated with the at least one associated command.

8. The method of claim 1, wherein the performing another action based on the another command further comprises:
performing the another action responsive to determining that the another command matches at least one universal command.

9. An information handling device, comprising:
a processor,
an audio capture device;
a memory device that stores instructions executable by the processor to:
receive, at the audio capture device, an activation cue;
receive, at the audio capture device, at least one command associated with a topic after the activation cue;
perform, using the processor, an action based on the at least one command;
receive, at the audio capture device, at least one other command, wherein the at least one other command is irrespective of the topic; and
perform, using the processor, another action based on the at least one other command without requiring another activation cue, wherein the instructions executable by the processor to perform another action based on the at least one other command comprise instructions executable by the processor to identify a relationship between the at least one other command and the at least one command, wherein the relationship is based on a location and wherein the action and the at least one other action are associated with the location.

10. The information handling device of claim 9, wherein the performing the another action require the additional audio input be received within a predetermined amount of time after performing the action.

11. The information handling device of claim 9, wherein the relationship is based on an association between the action and the another action.

12. The information handling device of claim 9, wherein the relationship is based on a time of day.

13. The information handling device of claim 9, wherein the relationship is based a factor selected from the group consisting of: at least one currently active application and at least one recently active application.

14. The information handling device of claim 9, wherein the performing another action based on the at least one other command further comprises:
 accessing, in a storage device, historical user voice data;
 identifying, using historical audio data, at least one associated command based on the at least one command; and
 performing the another action if the at least one other command is associated with the at least one associated command.

15. The information handling device of claim 9, wherein the performing another action based on the another command further comprises:
performing the another action responsive to determining that the another command matches at least one universal command.

16. A product, comprising:
a storage device having code stored therewith, the code being executable by a processor and comprising:
code that receives, at an audio capture device, an activation cue;
code that receives, at an audio capture device, at least one command associated with a topic after the activation cue;
code that performs, using a processor, an action based on the at least one command;
code that receives, at the audio capture device, at least one other command, wherein the at least one other command is irrespective of the topic; and
code that performs, using the processor, another action based on the at least one other command without requiring another activation cue, wherein the code that performs another action based on the at least one other command comprises code that identifies a relationship between the at least one other command and the at least one command, wherein the relationship is based on a location and wherein the action and the at least one other action are associated with the location.

* * * * *